United States Patent [19]

Knapczyk

[11] Patent Number: 4,590,101

[45] Date of Patent: May 20, 1986

[54] SURFACE COATING PROCESS
[75] Inventor: Jerome W. Knapczyk, Wilbraham, Mass.
[73] Assignee: Monsanto Company, St. Louis, Mo.
[21] Appl. No.: 757,037
[22] Filed: Jul. 19, 1985
[51] Int. Cl.$^4$ .......................... B05D 3/02; B05D 3/12
[52] U.S. Cl. .................................. 427/350; 427/385.5; 427/386; 427/389.7; 525/298; 525/306
[58] Field of Search ............... 427/385.5, 389.7, 389.8, 427/389.9, 350, 386; 525/298, 306

[56] References Cited
U.S. PATENT DOCUMENTS

| | | | |
|---|---|---|---|
| 3,996,308 | 12/1976 | Douek et al. | 525/298 X |
| 4,199,492 | 4/1980 | Roth | 525/193 X |
| 4,296,277 | 10/1981 | Seeburger et al. | 526/320 |
| 4,333,971 | 6/1982 | Van Eenam | 427/389.9 |
| 4,442,138 | 4/1984 | Bich et al. | 427/350 X |
| 4,444,806 | 4/1984 | Morgan et al. | 427/389.7 X |
| 4,520,184 | 5/1985 | Van Eenam | 526/320 |

Primary Examiner—Michael R. Lusignan
Attorney, Agent, or Firm—R. Bruce Blance; Nancy J. Linck; William J. Farrington

[57] ABSTRACT

A process for coating a substrate with a film of cured polymer in which a mixture of a poly ($\alpha$, $\beta$-ethylenically unsaturated) oligomer, a polyallyloxy activator compound containing an effective amount of a free radical polymerization initiator and a catalytic amount of metal drier is prepared, the admixture is applied to the substrate in an air or oxygen rich atmosphere and the coated substrate is then placed in an atmosphere substantially free of oxygen until the coating has cured to a substantially tack-free condition.

10 Claims, No Drawings

SURFACE COATING PROCESS

This invention relates to a surface coating process and more particularly it relates to a process involving solventless or concentrated solutions of coating compositions containing unsaturated oligomers, which are cured rapidly in an oxygen-deficient atmosphere.

Ethylenically unsaturated oligomers have for many years been cured by electron beam radiation in an anaerobic atmosphere. Although the process is extremely fast, the EB equipment is expensive, space demanding and places limits on the shapes and configurations of substrates which can be efficiently cured.

Attempts to cure unsaturated vehicles with peroxide or azoinitiators usually result in incompletely cured coating. Attempts to cure these coatings under practical, oxygen deprived conditions have largely been unsuccessful because of the difficulty of removing trace amounts of oxygen. Use of plastic layering or the addition of a wax that exudes to the surface to provide an anaerobic environment produces cured coatings with surface defects that prevents their use for many applications requiring a clear, glossy surface.

Coating compositions comprising polyacrylyl oligomers, polyallyloxy oligomers, metallic drier and organic hydroperoxide have been disclosed as suitable compositions for free-radical cure under aerobic or anaerobic conditions. However such compositions have a rather short pot life. Isocyanate coating compositions have been cured by a process called "Vapocure" in which the coated compositions are placed in a controlled anaerobic atmosphere containing a volatile amine catalyst. Generally the controlled atmosphere is obtained in a chamber connected to ante-chambers to isolate the curing chamber from the surrounding atmosphere and limit the escape of toxic amine vapors. The cure rate is dependent on the concentration of amine in the chamber atmosphere and on the thickness of the coating. Indeed thick films may not cure completely in their innermost depths. Constant recycle of the atmosphere, with monitoring of amine concentration and addition of fresh amine complicates the process. The cured products are often characterized by an unpleasant amine odor.

The present invention is directed to a process of coating a substrate with a coating composition containing unsaturated monomers in which a first component of the coating composition comprising an $\alpha, \beta$-ethylenically unsaturated oligomer is mixed with a second component of the coating composition comprising a polyallyloxy oligomer activator and a free radical polymerization initiator, the mixture is applied to the substrate in an oxygen or air environment and allowed to dry, and the substrate is then simply placed in an oxygen-deficient atmosphere until it has cured to an acceptable degree. Advantageously a metal drier may be used to catalyze the cure and can be added to the coating composition with the $\alpha, \beta$-ethylenically unsaturated oligomer or as a separate component prior to application of the coating composition or it may be spray applied to the coating composition after it has been applied to the substrate. The process is characterized by its relatively rapid curing rate at low temperatures, by its thorough cure of thick coatings, by its use of high solids or solvent free systems, by its energy efficiency, by its ease of application to any contoured or shaped surface and by its freedom from obnoxious odors. The activating polyallyloxy oligomer renders the mixed coating composition highly active for cure in the presence of low concentrations of oxygen even at room temperature so that heating and extraordinary precautions to eliminate oxygen from the atmosphere of the curing chamber are not necessary to attain full cure. On the other hand curing is retarded long enough under ambient air conditions so that reasonable open times are possible to aid processing requirements. Thus a coating may be applied to a substrate where it is allowed to flow out or meet other processing requirements and then cured sometime later when the coated substrate is placed in an oxygen deprived environment. However this does not exclude application of the coating to a substrate already contained in an oxygen deprived environment.

The polyallyloxy activator compound is a compound of allyloxy equivalent less than about 300 whose molecules contain from 4 to 60 allyloxy groups attached directly to skeletal carbon atoms. The allyl group can be unsubstituted allyl, methallyl or ethallyl.

Suitable polyallyloxy activator compounds may be selected from the group of polyethers and polyesters represented by the structural formulae:

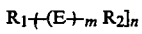

where $R_1$ is a radical of molecular weight less than about 2000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where E is a divalent radical selected from the group represented by the formulae

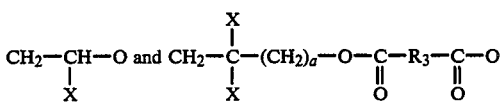

where the X groups are independently selected from the group consisting of H, $CH_3$, $C_2H_5$ and $CH_2OY$, Y being selected from the group consisting of $CH_2-CH=CH_2$,

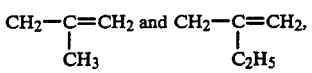

where a is 0 or 1, where $R_2$ is hydrogen or an unsubstituted or substituted $C_1$ to $C_{10}$ hydrocarbyl radical, where $R_3$ is a divalent unsubstituted or substituted $C_2$ to $C_{10}$ hydrocarbyl radical and where the product of m and n is at least 4 and not more than about 60. The polyethers may be prepared by ionic polymerization of allyl glycidyl ether or mixtures of allyl glycidyl ether and the appropriate alkylene oxide and the polyesters may be prepared by condensation polymerization of a suitable dicarboxylic acid, an alkylene glycol and the $\alpha$-allyl ether of glycerol. Suitable polyesters may also be prepared by substituting for the $\alpha$-allyl ether of glycerol, the monoallyl ether of trimethylolethane, the monoallylether of trimethylolpropane, the monoallyl ether of pentaerythritol, the diallyl ether of pentaerythritol and similar mono and polyallyl ethers of polyols.

Another group of suitable polyallyloxy activator compounds is represented by the structural formula:

where $R_4$ is a $C_4$ to $C_{12}$ aliphatic hydrocarbyl or oxahydrocarbyl radical of equivalence p in the range of 4 to 12 and Y is a group as defined hereinabove. Such compounds include tetrallyl pentaerythritol, hexaallyl dipentaerythritol, hexallyl sorbitol, hexamethallyl mannitol, tetraallyl-β-methyl glucoside, and decaallyl sucrose.

Yet another group of suitable polyallyloxy activator compounds are polyacetals of allyl alcohol and polyaldehydes represented by the structural formula:

where $R_5$ is absent or is a $C_1$ to $C_{10}$ unsubstituted or substituted hydrocarbyl group, Y is a group as defined hereinabove and q is in the range of 2 to about 30. Such compounds include 1,1,2,2-tetrakis(allyloxy)ethane, 1,1,6,6-tetrakis(allyloxy)hexane and the allyl acetals of polyacrolein and of acrolein copolymers of molecular weight up to about 3000.

The preferred allyloxy compounds are the polyether and polyacetal oligomers in which the number of allyloxy groups per average molecule is in the range of 6 to 40 and the allyloxy equivalent is less than about 250. More preferably the allyloxy equivalent is less than about 150.

The α, β-ethylenically unsaturated oligomer of the present invention is a non-air-curing, free-radical-polymerizable monomer or mixture of monomers having a structure comprising at least two ethylenically unsaturated groups. The nature of the molecule is not critical so long as it is activated towards free-radical polymerization via the double bonds when it is brought into reactive admixture with a free-radical initiator. Such polyunsaturated monomers include among other types, acrylic monomers, styrenic monomers, vinyl ethers, vinyl esters, vinyl imides, vinyl amides, maleates and fumarates. Preferred monomers are polyacrylyl monomers, polymaleates and polyfumarates of number average molecular weight less than about 4000 containing from about 2 to about 10 unsaturated groups per molecule. A particularly preferred group of polyacrylyl monomers is represented by the structure:

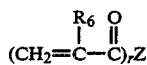

where $R_6$ is selected from the group consisting of H, $CH_3$ and $C_2H_5$; where r is an integer in the range of 2 to 10 and Z is a saturated or ethylenically unsaturated residue of a polyol, a polycarboxylic acid, a polyamine, a polyepoxide or a polyisocyanate of a number average molecular weight less than about 4000 containing a hydrocarbon, polyester, polyamide, polyether or polyurethane backbone. Such monomers may be obtained by reaction of acryloyl, methacryloyl or ethacryloyl chloride with a polyol or a polyamine or by the reaction of acrylic acid, methacrylic acid or ethacrylic acid with a polyepoxide or a polyisocyanate, or by the reaction of a hydroxyalkyl acrylate, methacrylate or ethacrylate with a polycarboxylic acid, a polyepoxide or a polyisocyanate. Such monomers include 1,3-butylene glycol diacrylate; 1,6-hexanediol diacrylate; the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate; trimethylolpropane triacrylate; dipentaerythritol monohydroxypentacrylate, ethoxylated bisphenol A dimethacrylate; the diacrylates; dimethacrylates and diethacrylates of epoxy oligomers formed from bisphenol A and epichlorohydrin of molecular weight in the range of 200 to 4000, and the polyacryloyl monomers prepared by reacting isocyanate capped polyethers and isocyanate capped polyesters of molecular weight up to 4000 with hydroxyethyl acrylate.

In the method of this invention a free radical polymerization initiator is included with the polyallyloxy activator component. Homolytic decomposition of these initiators provides a ready source of radicals which are propagated by the polyallyloxy activator and initiate copolymerization of the α, β-ethylenically oligomer and the activator to yield a solvent resistant film. When the initiator is used without the activator, even traces of oxygen interact with the free radicals generated by the initiator, effectively reducing the concentration of free radicals and inhibiting the polymerization. As a result a lenthy induction period occurs and poorly cured films are obtained.

Interaction between the components of the coating system, namely the component comprising initiator and activator and the unsaturated oligomer component can take place without a catalyst. Generally initiation without a catalyst requires elevated temperatures before acceptable reaction rates can be achieved. The use of minor amounts of a metal drier catalyst selected from those conventionally used as driers in coating compositions is usually helpful at a concentration range of from 0.001 to 1.0% by weight of a metallic drier, enabling rapid reaction to occur even at room temperature or lower. The metallic driers may be any of those conventionally used for air-drying of coatings, including the salts and soluble complexes of transition elements such as cobalt and manganese. Typical representatives include cobaltous acetate, citrate, acetyl-acetonate and 2-ethyl hexanoate, and the corresponding soluble manganous salts and complexes. Generally salts are preferred to complexes since they appear to generate higher reaction rates. The metallic drier is usually added in the form of a solution in a suitable solvent that will ensure dispersion of drier throughout the reaction mixture.

The catalyst can be added to the formulation of the admixture with the unsaturated oligomer, or separately during, or after application of the mixture of components to the substrate.

Depending on the end use and the application requirements it may be convenient to add any of the other conventional additives for surface coating compositions such as solvents, pigments, fillers, reinforcing agents, stabilizers, inhibitors and flow control agents.

The proportions of the ingredients can vary widely depending on the compatibility of the major ingredients namely the allyloxy activator compound and the α, β-ethylenically unsaturated monomer and the nature of the coating to be obtained. The major ingredients are advantageously selected to be compatible with one another to avoid decrease in rate of cure of the mixed ingredients or impairment of gloss and clarity of the cured coatings. Compatibility is readily determined by mixing the major ingredients and determining the range of mixtures which do not form cloudy solutions or separate into phases. Provided that the major ingredients are suitably compatible, a weight range of activator to ethylenically unsaturated oligomer in the range of from 70:30 to 1:99 can be used. Preferably this ratio will be in the range from 40:60 to 5:95 to provide an adequate rate of cure and an adequate level of mechanical properties in the cured coating. The concentration of initiator in the combined weight of initiator, activator and unsaturated oligomer components can vary from about 1 to about 100 meq per 100 g. and preferably from about 5 to about 30 meq per 100 g to provide an adequate rate of cure without excessive generation of by-products. In one embodiment of the invention, the initiator can be provided as hydroperoxy substituents of the activator, thus dispensing with the need to add the initiator as a separate chemical entity. Hydroperoxy substituents can be provided by air or oxygen sparging of the activator at a temperature in the range of about 25° C. to about 100° C. for a time in the range of about 0.5 hour to about 10 days until the desired hydroperoxide level is obtained. At the higher levels of hydroperoxy substitution excessive viscosity increase can occur and the hydroperoxy activator may become discolored and manifest a tendency to gelation upon storage.

Curing of the coating composition after it has been deposited on the substrate can be carried out at temperatures of 250° C. or lower. Though the cure rate will usually increase as the temperature increases the preferred cure temperature for low energy curing is 10° C. to 60° C. and the initiator and its concentration are selected to be effective in this temperature range.

The compositions of this invention applied to a substrate may cure in minutes to several hours or not cure at all under ambient air conditions. However when a substrate coated with these compositions is placed in an oxygen deprived environment the cure rate increases dramatically.

In the coating process of the present invention, the first component comprising the ethylenically unsaturated oligomer, and the metal drier catalyst if low temperature cure is desired, is mixed with the second component comprising the allyloxy activator and the free radical polymerization initiator and the mixture immediately applied to the substrate. Because of the limited pot life of the mixture, the two components are advantageously supplied continuously in the desired weight ratio to a mixer-applicator or a spray gun and thereafter mixed and applied or sprayed onto the substrate. Alternatively the ethylenically unsaturated oligomer may be mixed in the applicator or spray gun with the second component stream, and the mixture is then applied or sprayed onto the substrate, followed by application or spraying of the catalyst to the coated substrate. When the components of the coating composition are diluted with solvent to provide a suitable viscosity for spray application and flow, especially when the compositions contain a high pigment loading, the coated substrate is allowed to dry in air or in an oxygen rich atmosphere until the solvent is substantially volatilized, optionally with application of heat to hasten the evaporation of solvent. When thick films are required, multiple coatings may be applied and solvent evaporated after each application. After the solvent has been evaporated, the coated substrate is transferred to a chamber capable of providing an oxygen deficient inert atmosphere for example by application of vacuum or by substantial displacement of air in the chamber with nitrogen. Rapid cure of the coated composition occurs in a matter of minutes or even seconds after the coated substrate enters the chamber and can be further hastened by application of heat. However especially when the coating composition is a high solids system free from solvent, the composition may be mixed and sprayed by means of a nitrogen spray and the mixed composition may be applied directly to the substrate in the oxygen deficient atmosphere.

The components of the coating composition may also be prepared as aqueous dispersions with or without pigments. The dispersions are formulated with conventional surfactants to provide stable dispersions. Preferably in such aqueous dispersions the catalyst is an organic solvent soluble metallic drier such as cobalt 2-ethylhexanoate rather than a water soluble salt such as cobaltous acetate so that uniform dispersion of the catalyst in the organic phase of the coating composition is obtained. However, it can be advantageous to use water soluble salts to allow the coating composition to be applied and to flow out before the water is evaporated and cure is accelerated.

The following examples are set forth to illustrate the present invention and should not be construed as limiting its scope. Quantities and percentages are by weight unless otherwise indicated.

EXAMPLE A

Preparation of ethylene-10 allyl glycidyl ether

This example describes the production of a polyallyloxy activator useful in the process of this invention.

A reaction vessel is charged with ethylene glycol which is reacted with allyl glycidyl ether in a 1:10 mole ratio in the presence of boron trifluoride/etherate catalyst at a temperature in the range of about 75°–80° C. The allyl glycidyl ether is added gradually over a period of five hours. The catalyst is neutralized with aqueous sodium hydroxide solution and after removal of the aqueous layer the residue is dried and filtered. The liquid product obtained has a Gardner viscosity at 25° C. of F. The allyloxy equivalent is about 120.

EXAMPLE B

Preparation of sorbitol-30allylglycidyl ether

Similar to A except that sorbitol is reacted in a 1:30 ratio with allyl glycidyl ether. The allyloxy equivalent is about 120.

EXAMPLE C

Preparation of methyl alcohol-5 allyl glycidyl ether

Similar to A except that methyl alcohol is reacted in a 1:5 ratio with allyl glycidyl ether. The allyloxy equivalent is about 120.

EXAMPLE D

Preparation of 2-propylene oxide 3-allyl glycidyl ether oligomer

To a cooled, rapidly stirring solution containing 250 parts by weight of toluene, 45 parts by weight of allyl alcohol and 10 parts by weight of boron trifluoride etherate at 12° C., is added over a six hour period a solution of 600 parts by weight allyl glycidyl ether and 400 parts by weight of propylene oxide. During the addition the temperature of the reacting mixture is gradually raised to 75° C. When addition is complete a solution of 32 parts by weight sodium carbonate in 150 parts by weight of water is added to the reaction mixture. After the aqueous layer settles out it is drawn off and the organic layer is devolatilized for about one hour at 125° C., under reduced pressure. The colorless organic residue is used without further modification. Its allyloxy equivalent is about 160.

EXAMPLES 1 and 2 and COMPARATIVE EXAMPLES C1-C12

The components of coating compositions set forth in Table 1 are prepared from the following ingredients:

$M_1$, an 80% solution of the diacrylate ester of a bisphenol A epoxy resin of molecular weight 840 in methyl ethyl ketone (MEK);

$M_2$, an 80% solution of the diacrylate ester of a hydroxy terminated urethane oligomer and ethoxyethoxyethyl acrylate (weight ratio 9:1) in methyl ethyl ketone;

A, the polyallyoxy activator of example A;

TBH, t-butyl hydroperoxide; and

CoK, a solution of cobalt potassium metal complex fatty acid salt sold by Tenneco under the tradename "Nuocure CK", in methyl ethyl ketone providing 1.0 g metal per 100 ml of solution.

Examples 1 and 2 are used to demonstrate the process of the present invention in comparison with examples C1 to C12 which illustrate the effect of omitting ingredients from the compositions.

TABLE 1

| Two Component Coating Compositions | | |
|---|---|---|
| Coating Composition | Component I, pbw | Component II, pbw |
| C1 | $M_1$, 4.0; MEK 1.0 | A, 1.0 |
| C2 | $M_1$, 4.0; MEK 1.0 | A, 1.0; TBH, 0.09 |
| C3 | $M_1$, 4.0; MEK 1.2; CoK 0.0020 | A, 1.0 |
| 1 | $M_1$, 4.0; MEK 1.2; CoK 0.0020 | A, 1.0; TBH, 0.09 |
| C4 | $M_1$, 4.0; MEK 1.0 | TBH, 0.09 |
| C5 | $M_1$, 4.0; MEK 1.2; CoK 0.0020 | TBH, 0.09 |
| C6 | $M_1$, 4.0; MEK 1.0 | — |
| C7 | $M_2$, 4.0; MEK 1.0 | A, 1.0 |
| C8 | $M_2$, 4.0; MEK 1.0 | A, 1.0; TBH, 0.18 |
| C9 | $M_2$, 4.0; MEK 1.25, CoK 0.0025 | A, 1.0 |
| 2 | $M_2$, 4.0; MEK 1.25, CoK 0.0025 | A, 1.0; TBH, 0.18 |
| C10 | $M_2$, 4.0; MEK 1.0 | TBH, 0.18 |
| C11 | $M_2$, 4.0; MEK 1.25, CoK 0.0025 | TBH, 0.18 |
| C12 | $M_2$, 4.0; MEK | — |

The two components are mixed together and the mixture is applied to two sets of glass panels using a 3.0 mil (76 micron) doctor blade providing a 2.4 mil (61 micron) dry film. After 15 minutes under ambient conditions to allow solvent to evaporate, one set of panels is placed in a nitrogen gas filled chamber at 27° C. The other set of coated panels is left to cure under ambient air conditions.

All cured samples are evaluated for MEK double rub resistance 24 hours after reaching the tack-free state. Pencil hardness is evaluated 48 hours after achieving the tack-free state. The results are shown in Table 2.

TABLE 2

| | Anaerobic Conditions | | | Air Dry Conditions | | |
|---|---|---|---|---|---|---|
| Coating Composition | Tack-free Time (Min) | MEK Rubs | Pencil Hardness | Tack-Free Time (hours) | MEK Rubs | Pencil Hardness |
| C1 | >30 | 0 | tacky | >24 | 0 | tacky |
| C2 | >30 | 0 | tacky | >24 | 0 | tacky |
| C3 | >30 | 0 | tacky | 4.5 | >300 | 4H |
| 1 | 1.5 | >300 | 3H | 2.2 | >300 | 3H |
| C4 | >30 | 0 | tacky | >24 | 0 | tacky |
| C5 | 14 | 60 | F | >24 | 0 | tacky |
| C6 | >30 | 0 | tacky | >24 | 0 | tacky |
| C7 | >30 | 0 | tacky | >24 | 0 | tacky |
| C8 | >30 | 0 | tacky | >24 | 0 | tacky |
| C9 | >30 | 0 | tacky | >24 | 0 | tacky |
| 2 | 1.5 | >300 | F | 1.1 | >300 | H |
| C10 | >30 | 0 | tacky | >24 | 0 | tacky |
| C11 | 9 | 50 | 2B | 1.5 | 30 | HB |
| C12 | >30 | 0 | tacky | >24 | 0 | tacky |

These results clearly show that the polyallyloxy activator promotes rapid curing under both anaerobic and air dry conditions and produces coatings with superior solvent resistance and hardness compared to coatings not containing the activator. Moreover cure under anaerobic conditions allows the tack free state to be reached about 90 times faster than under air dry conditions.

EXAMPLES C13 and 3-6

These examples show how changing the concentration of catalyst affects cure properties.

The coating compositions are made by mixing component I with component II adding catalyst and immediately applying the mixture to a glass panel with a 1.5 mil (38 micron) doctor blade. The samples are allowed to dry under ambient conditions for 15 min. prior to being placed in an enclosed chamber that is flushed continuously with nitrogen. The temperature of the anaerobic chamber is 26.5° C. The results are recorded in Table 3.

Component I consists of 4.0 parts by weight of a diacrylate ester of a hydroxy terminated urethane oligomer sold by Sartomer under the tradename Sartomer 9504 in 0.5 parts by weight methyl ethyl ketone. Component II consists of 1.0 part by weight of the polyallyloxy activator of Example A and 0.09 part by weight t-butylhydroperoxide. The amounts of cobalt/potassium metal catalyst added to Examples C13 and 3-6 as a 1% solution of Nuocure CK in methyl ethyl ketone are respectively 0; 0.001; 0.002; 0.005 and 0.01 parts by weight. MEK solvent resistance and pencil hardness of the cured coating compositions are determined after 24 hours under ambient conditions following the attainment of the tack free state. In the tables which follow NC denotes no cure.

TABLE 3

| Effect of catalyst concentration on cure of coating compositions. | | | | | |
|---|---|---|---|---|---|
| Coating Composition | C13 | 3 | 4 | 5 | 6 |
| Catalyst, % CoK metal by dry weight | 0 | 0.02 | 0.040 | 0.10 | 0.20 |
| Tack-free Time (sec.) | NC | 45 | 25 | 10 | 10 |
| MEK Rubs | 0 | 300 | 300 | 150 | 150 |
| Pencil Hardness | — | HB | HB | HB | HB |

EXAMPLES C14 and 7-10

These examples show how changing the concentration centration of activator, affects cure properties. The ingredients are the same as those of Examples 3-6, formulated as set forth in Table 4.

TABLE 4

Coating Compositions of Examples C-14 and 7-10

| Coating Composition | Component I, pbw | Component II pbw | Catalyst, Co, pbw |
|---|---|---|---|
| C14 | M$_2$, 5.0; MEK 0.5 | A, 0.0; TBH, 018 | 0.0020 |
| 7 | M$_2$, 4.5; MEK 0.5 | A, 0.5; TBH, 0.18 | 0.0020 |
| 8 | M$_2$, 4.0 MEK 0.5 | A, 1.0; TBH, 0.18 | 0.0020 |
| 9 | M$_2$, 3.5 MEK 0.5 | A, 1.5; TBH, 0.18 | 0.0020 |
| 10 | M$_2$, 3.0; MEK 0.5 | A, 2.0; TBH, 0.18 | 0.0020 |

The coating compositions are made by mixing component I with component II adding catalyst and immediately applying the mixture to a glass panel with a 1.5 ml (38 micron) doctor blade. The samples are allowed to dry under ambient conditions for 15 min. prior to being placed in an enclosed chamber that is flushed continuously with nitrogen. The temperature of the anaerobic chamber is 26.5° C. The results are recorded in Table 5.

TABLE 5

Effect of polyallyloxy activator on cure of coating compositions

| Coating Composition | C14 | 7 | 8 | 9 | 10 |
|---|---|---|---|---|---|
| Activator concentration % by dry weight | 0 | 9.7 | 18.3 | 28.0 | 38.6 |
| Tack-free Time (sec.) | N.C. | 150 | 45 | 45 | 75 |
| MEK Rubs | — | 300 | 300 | 300 | 300 |
| Pencil Hardness | — | F | 4H | 4H | 4H |

No cure is observed with coating composition C14 containing no polyallyloxy activator. Fast cure occurs when it is present, with an optimum amount in the range of about 18 to 30 percent of the dry coating.

EXAMPLES C15 and 11-13

These examples show how changing the concentration of initiator affects cure properties. The coating compositions are made by mixing Component I with Component II adding catalyst and immediately applying the mixture to a glass panel with a 1.5 mil (38 micron) doctor blade. The samples are allowed to dry under ambient conditions for 15 min. prior to being placed in an enclosed chamber that is flushed continuously with nitrogen. The temperature of the anaerobic chamber is 26.5° C. The results are recorded in Table 6.

Component I is the same as Component I of examples 3-6, and Component II is the same as Component II except that the initiator concentration is 0, 0.045, 0.09 and 0.36 parts by weight in examples C15, 11, 12 and 13 respectively.

TABLE 6

Effect of initiator on cure of coating composition

| Coating Composition | C15 | 11 | 12 | 13 |
|---|---|---|---|---|
| Initiator concentration % by dry weight | 0 | 0.89 | 1.77 | 6.72 |
| Tack-free Time (sec.) | NC | 30 | 15 | 15 |
| MEK Rubs | 0 | 300 | 300 | 300 |
| Pencil Hardness | — | 2H | 2H | 4H |

The data show that no cure occurs without initiator even when the polyallyloxy activator is present, and that cure rate is unaffected by increase in initiator concentration above about 1.5 weight percent.

EXAMPLE 14

This example shows the effect of temperature on the tack-free time of an anaerobically cured composition.

Three samples are made by mixing Component I with Component II, adding catalyst and immediately applying each mixture with a 1.5 mil (38 micron) doctor blade to a glass panel. The solvent is allowed to evaporate for 15 min. under ambient conditions and then the coated panels are placed in a heated chamber which is continuously flushed with preheated nitrogen. The results are recorded in Table 7.

Component I contains 5.0 part by weight of nonvolatile diacrylate ester of a bisphenol A epoxy resin of 840 molecular weight. Component II contains 1.0 part by weight of the polyallyloxy activator of Example A and 0.09 parts by weight of tertiary butyl hydroperoxide. Cobalt catalyst (0.0020 parts by weight cobalt is added as a 10% solution of Nuocure CK in methyl ethyl ketone.

TABLE 7

Effect of temperature on cure time

| Coating Composition | Temperature | Tack-free Time |
|---|---|---|
| 14 (1) | 26° C. | 60 sec. |
| 14 (2) | 48° C. | 30 sec. |
| 14 (3) | 68° C. | 10 sec. |

EXAMPLES 15-18 and C16-C18

These examples illustrate the advantage of using the polyallyloxy activators of this invention compared with using some common polyallyl esters.

Samples are prepared and applied as described in Example 4 except that the activator component is varied as shown in Table 8. The coated substrates are cured anaerobically at 26° C. The MEK solvent resistance test is performed after 48 hrs. aging under ambient conditions.

TABLE 8

Comparison of Polyallyl Activators

| Coating Composition | Activator | Tack-free Time (Min.) | MEK Rubs |
|---|---|---|---|
| 15 | Example A | <1 | >300 |
| 16 | Example B | <1 | >300 |
| 17 | Example C | 7 | >300 |
| 18 | Example D | <1 | >300 |
| C16 | diallyl malonate | 3 | 25 |
| C17 | tetrallyl pyromellitate | >30 | 0 |
| C18 | diallyl terephthalate | >30 | 0 |

I claim:
1. A process for coating a substrate with a film of cured polymer which comprises:
   A. admixing a first component comprising poly(α, β-ethylenically unsaturated) oligomer with a second component comprising a polyallyloxy activa- tor compound and an effective amount of a free radical polymerization initiator;

B. adding an effective amount of metal drier catalyst to the admixture;

C. applying a film of the admixture to the substrate in an air or oxygen-rich atmosphere; and D. placing the substrate in an atmosphere substantially free of oxygen for a sufficient time to allow the film to cure to a tack-free condition; wherein the polyallyloxy activator compound is selected from the group represented by the formulae $$R_1\text{—}(E)_mR_2]_n, R_4(OY)_p \text{ and } R_5[CH(OY)_2]_q$$

where $R_1$ is a radical of molecular weight less than about 2000 obtained by removal of active hydrogen from an active hydrogen compound selected from the group consisting of water, alcohols, thiols, carboxylic acids, carboxylic amides and amines, where the functionality of $R_1$ is n and is in the range of 1 to 10, where E is a divalent radical selected from the group represented by the formulae $$CH_2\text{+}CH\text{—}O \text{ and } CH_2\text{—}\underset{X}{\underset{|}{C}}\text{—}(CH_2)_a\text{—}O\text{—}\underset{O}{\underset{\|}{C}}\text{—}R_3\text{—}\underset{O}{\underset{\|}{C}}\text{—}O$$

where X is selected from the group consisting of H, $CH_3$, $C_2H_5$ and $CH_2OY$, Y being selected from the group consisting of $CH_2\text{—}CH\text{=}CH_2$, $$CH_2\text{—}\underset{CH_3}{\underset{|}{C}}\text{=}CH_2 \text{ and } CH_2\text{—}\underset{C_2H_5}{\underset{|}{C}}\text{=}CH_2,$$

where a is 0 or 1, where $R_2$ is hydrogen or an unsubstituted or substituted $C_1$ to $C_{10}$ hydrocarbyl radical, where $R_3$ is a divalent unsubstituted or substituted $C_2$ to $C_{10}$ hydrocarbyl radical and where the product of m and n is at least 4 and not more than about 60; where $R_4$ is a $C_4$ to $C_{12}$ aliphatic hydrocarbyl or oxahydrocarbyl radical of equivalence p in the range of 4 to 12; where $R_5$ is absent or is a $C_1$ to $C_{10}$ unsubstituted or substituted hydrocarbyl group and q is in the range of 2 to about 30; wherein the weight ratio of poly($\alpha$, $\beta$-ethylenically unsaturated) oligomer to polyallyloxy activator compound is in the range of about 30:70 to about 99:1; and wherein the polyallyloxy activator contains from 4 to 60 allyloxy groups per molecule.

2. The process of claim 1 wherein the metal drier catalyst, in the range of 0.001 to 1.0 parts by weight per 100 parts by weight of poly ($\alpha$, $\beta$-ethylenically unsaturated) oligomer and polyallyloxy activator compound, is added to the first component.

3. The process of claim 1 wherein the admixture contains a solvent and wherein the solvent is allowed to evaporate from the film prior to step C.

4. The process of claim 1 wherein the admixture is an aqueous dispersion and wherein water is allowed to evaporate from the film prior to step C.

5. The process of claim 1 wherein the weight ratio of poly ($\alpha$, $\beta$-ethylenically unsaturated) oligomer to polyallyloxy activator compound is in the range of about 60:40 to about 95:5.

6. The process of claim 1 wherein the poly ($\alpha$, $\beta$-ethylenically unsaturated) oligomer is of number average molecular weight in the range of 200 to 2000 and contains an average of 2 to 10 ethylenically unsaturated groups per molecule and wherein the allyloxy activator compound has an allyloxy equivalent of less than 300.

7. The process of claim 1 wherein the poly($\alpha$, $\beta$-ethylenically unsaturated) oligomer is represented by the formula $$(CH_2\text{=}\underset{R_6}{\underset{|}{C}}\text{—}\underset{O}{\underset{\|}{C}})_rZ$$

where $R_6$ is selected from the group consisting of H, $CH_3$ and $C_2H_5$, where r is an integer in the range of 2 to 10 and Z is a saturated or ethylenically unsaturated residue of a polyol, a polycarboxylic acid, a polyamine, a polyepoxide or a polyisocyanate of a number average molecular weight less than about 2000 containing a hydrocarbon, polyester, polyamide, polyether or polyurethane backbone.

8. The process of claim 1 wherein the free radical initiator is selected from t-butyl hydroperoxide, cumene hydroperoxide, methyl ethyl ketone peroxide, lauroyl peroxide, benzoyl peroxide and azo-bis(isobutyronitrile).

9. The process of claim 1 wherein the allyloxy activator compound has an allyloxy equivalent of less than 150.

10. The process of claim 1 wherein the polyallyloxy activator contains from 6 to 40 groups per molecule.

* * * * *